UNITED STATES PATENT OFFICE.

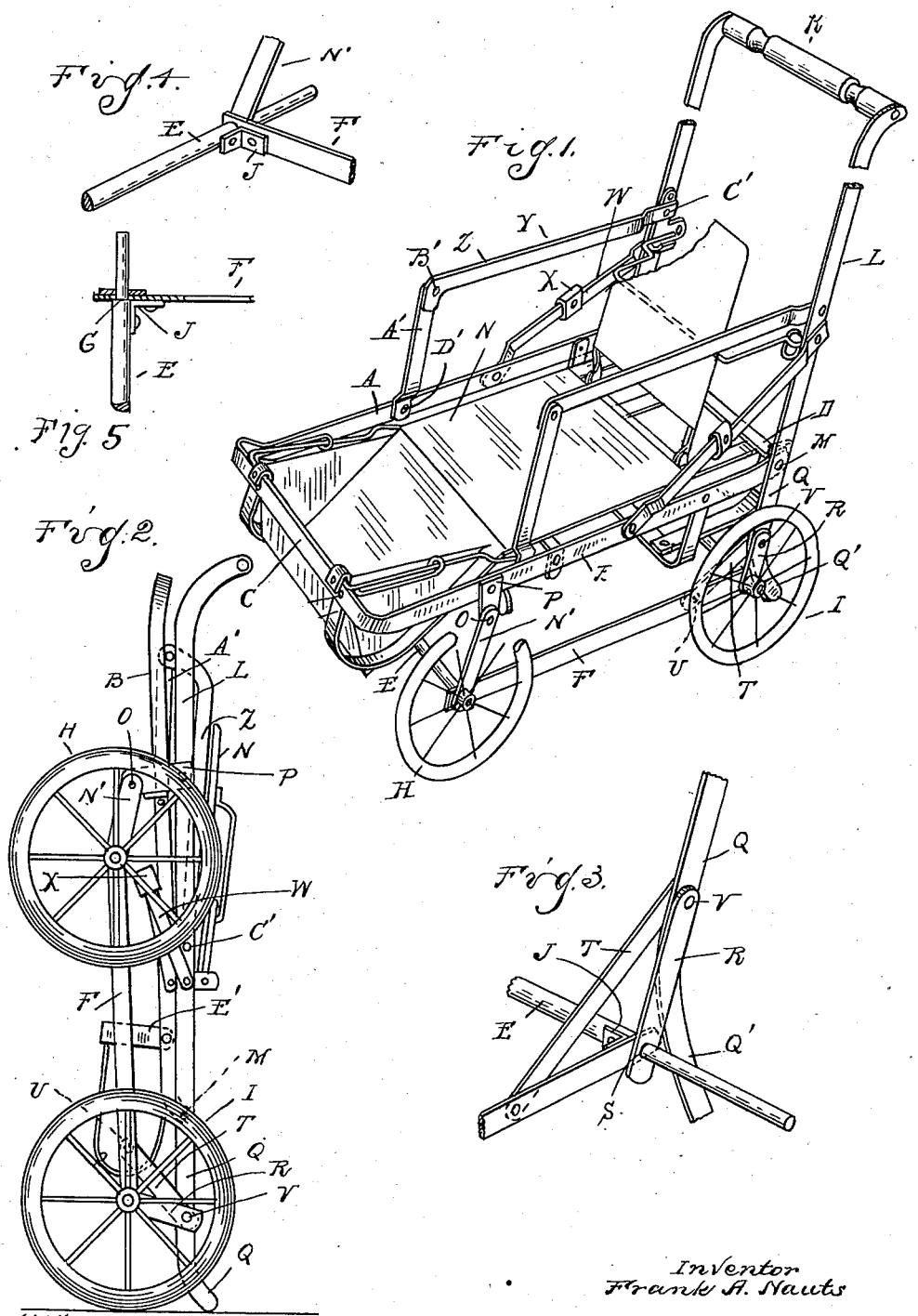

FRANK A. NAUTS, OF TOLEDO, OHIO, ASSIGNOR TO GENDRON WHEEL COMPANY, OF TOLEDO, OHIO, A CORPORATION OF OHIO.

PERAMBULATOR.

1,066,034.  Specification of Letters Patent. Patented July 1, 1913.

Application filed September 17, 1912. Serial No. 720,839.

*To all whom it may concern:*

Be it known that I, FRANK A. NAUTS, a citizen of the United States of America, residing at Toledo, in the county of Lucas and State of Ohio, have invented certain new and useful Improvements in Perambulators, of which the following is a specification, reference being had therein to the accompanying drawings.

The invention relates to collapsible or folded perambulators and more particularly to that type of perambulator which is provided with a main horizontal frame and with a rigid horizontal axle frame, the latter being so connected to the main frame that upon folding of the perambulator the two horizontal frames will be moved together but leaving the wheels in their original relation to the axle frame, and in the same plane relative to the main frame as when the perambulator is unfolded.

The invention consists in the peculiar construction, arrangement and combinations of parts as will more fully hereinafter appear.

In the drawings,—Figure 1 is a perspective view of a perambulator embodying my invention; Fig. 2 is a side elevation showing the relation of the several parts when folded; and Figs. 3, 4 and 5 are fragmentary views illustrating certain details.

The main seat frame comprises spaced side bars A B having their opposite ends connected by cross bars C D while the axle frame is formed by axles E and ties F, the latter having their ends apertured as at G to engage the axles. The axles E project beyond the ties F and have their projecting ends shaped to form spindles for the front and rear wheels H I. By so arranging the axles a rigid frame is provided for carrying the wheels. Preferably the members E are non-rotatably secured to the ties as by angle shaped clips J.

K is the handle having spaced members L fulcrumed at M to extensions of the side bars which project rearwardly beyond the seat N.

The connection between the axle frame and the main or seat frame is formed by pivoted links arranged to turn about horizontal axes, and in order to avoid too great a relative longitudinal movement between the two frames during folding, a construction is provided which will shorten the operative length of the links and nevertheless permit the frames to be moved into sufficient proximity to each other to produce when folded the desired condensation of parts. As shown, N' are the front links having their lower ends apertured to pivotally engage the front axle and their upper ends pivoted at O to brackets P rigidly secured to the side bars.

Q are the rear links formed as integral extensions of the handle, these links being pivoted to brackets carried by the axle frame. The latter brackets are each formed by a vertical link R having an eye S for engaging the rear axle and a transversely extending brace member T secured at one end as by a rivet U to the side bars. The opposite ends of the link and the brace member are connected together by a pin V which also forms the pivotal connection between the bracket and the links Q.

The parts are locked in their extended relation by brace members W having rule joints X, these braces extending between the side bars and the members L on the handle.

Y designates the arm rest formed in the usual manner by a horizontally extending bar Z and a vertically extending link A', these members being pivoted together at B' and pivoted respectively to the members L and the side bars A B at C' and D'.

With the construction so far described, when the perambulator is folded, it is merely necessary to break the rule joint of the brace members W and then rock the handle forwardly. The forward rocking of the handle will effect a rocking of the links about their horizontal pivots and move the axle frame and main frame together, the parts being shown in their folded relation in Fig. 2. The links Q have curved extensions Q' which are of sufficient length to coöperate with the rear wheels to form a support for the cart when the latter is folded. As will be readily apparent upon inspection of this figure, the width of the perambulator when folded is substantially within the planes of the peripheries of the wheels. Because of the fact that the diameter of the wheels governs the width of the carriage when folded, the employment of the bracket members to which the front and rear links are connected does not prevent the proper condensation of the parts in their folded relation.

What I claim as my invention is:—

1. In a collapsible perambulator, the combination with a main frame, of a seat carried thereby, said frame having extensions projecting rearwardly beyond said seat, of a rigid axle frame including axles, front and rear wheels on said axles, pivoted front links connecting said frames, and a handle fulcrumed on said extensions extending below said main frame and pivotally connected to the axle frame, said handle, axle frame and main frame being adapted to be folded into parallelism.

2. In a collapsible perambulator, the combination with a main frame, of a seat carried thereby, said frame having extensions projecting rearwardly beyond said seat, of a rigid axle frame including axles, front and rear wheel on said axles, brackets carried by one of said frames, front links pivoted to said brackets and to the other of said frames, and a handle fulcrumed on said extensions extending below the main frame and pivotally connected to the axle frame, said handle, axle frame and main frame being adapted to be folded into parallelism.

3. In a collapsible perambulator, the combination with a main frame, of a seat carried thereby, said frame having extensions projecting rearwardly beyond said seat, of a rigid axle frame including axles, front and rear wheels on said axles, brackets carried by said main frame, pivoted front links connecting said brackets and the axle frame, and a handle fulcrumed on said extensions extending below the main frame and pivotally connected to the axle frame, said handle, axle frame and main frame being adapted to be folded into parallelism.

4. In a collapsible perambulator, the combination with a main frame, of a seat carried thereby, said frame having extensions projecting rearwardly beyond said seat, of a rigid axle frame including axles, front and rear wheels on said axles, brackets carried by the main frame, front links pivoted to said brackets and to the axle frame, brackets carried by the axle frame, and a handle fulcrumed on said extensions having portions extending below said main frame and pivoted to the last mentioned brackets, said handle, axle frame and main frame being adapted to be folded into parallelism.

In testimony whereof I affix my signature in presence of two witnesses.

FRANK A. NAUTS.

Witnesses:
  WALTER H. DIEMER,
  JOSHUA F. VOGEL.